United States Patent
Golitz et al.

(10) Patent No.: US 11,714,050 B2
(45) Date of Patent: Aug. 1, 2023

(54) METHOD FOR DETERMINING PHOSPHATE

(71) Applicant: HACH LANGE GMBH, Berlin (DE)

(72) Inventors: Andreas Golitz, Kamp-Lintfort (DE);
Andreas Jonak, Meerbusch (DE);
Michael Kussmann, Duesseldorf (DE);
Axel Leyer, Moenchengladbach (DE);
Andreas Schwenk, Brueggen (DE);
Markus Hahn, Kempen (DE)

(73) Assignee: HACH LANGE GMBH, Berlin (DE)

( * ) Notice: Subject to any disclaimer, the term of this patent is extended or adjusted under 35 U.S.C. 154(b) by 332 days.

(21) Appl. No.: 16/648,669

(22) PCT Filed: Aug. 9, 2018

(86) PCT No.: PCT/EP2018/071663
§ 371 (c)(1),
(2) Date: Jul. 9, 2020

(87) PCT Pub. No.: WO2019/057389
PCT Pub. Date: Mar. 28, 2019

(65) Prior Publication Data
US 2020/0340925 A1 Oct. 29, 2020

(30) Foreign Application Priority Data
Sep. 20, 2017 (DE) .................. 10 2017 121 797.5

(51) Int. Cl.
*G01N 21/78* (2006.01)
*G01N 31/22* (2006.01)

(52) U.S. Cl.
CPC ............. *G01N 21/78* (2013.01); *G01N 31/22* (2013.01)

(58) Field of Classification Search
CPC ................................ G01N 21/78; G01N 31/22
See application file for complete search history.

(56) References Cited

U.S. PATENT DOCUMENTS

| | | | |
|---|---|---|---|
| 3,796,543 A | 3/1974 | Kamphake | |
| 4,544,639 A | 10/1985 | Faust | |
| 4,599,316 A * | 7/1986 | Hahn | G01N 21/78 |
| | | | 436/103 |
| 4,843,015 A | 6/1989 | Grubbs, Jr. et al. | |
| 2015/0198540 A1 | 7/2015 | Zheng et al. | |

FOREIGN PATENT DOCUMENTS

| | | | |
|---|---|---|---|
| CN | 105987982 A | | 10/2016 |
| DE | 27 28 706 A1 | | 1/1979 |
| EP | 0 315 449 A2 | | 5/1989 |
| EP | 0 777 117 A2 | | 6/1997 |
| KR | 10-2013-0115526 A | | 10/2013 |
| KR | 20130115526 | * | 10/2013 |
| WO | WO 2016/133882 A1 | | 8/2016 |

OTHER PUBLICATIONS

D. C. Abbott et al.: "A Method for determining Orthophosphate in Water", Analyst, vol. 88, pp. 814-816 (1963).
O. G. Koch et al.: „Handbuch der Spurenanalyse, Teil 2, Springer-Verlag Berlin-Heidelberg-New York, pp. 898-902 (1974), English Translation of the relevant pages.
China National Intellectual Property Administration, "The First Office Action", dated Oct. 9, 2021, 15 pages.

* cited by examiner

*Primary Examiner* — Brian R Gordon
*Assistant Examiner* — Dwan A Gerido
(74) *Attorney, Agent, or Firm* — Ference & Associates LLC

(57) ABSTRACT

A method for determining a phosphate concentration in a water sample includes providing the water sample, adding a first acid to the water sample to obtain a second water sample in which a concentration of the first acid is at least 0.5 wt.-%, performing a first photometric measurement of the second water sample, adding a coloring component to the second water sample to obtain a third water sample, performing a second photometric measurement of the third water sample, and calculating the phosphate concentration from a difference between the first photometric measurement and the second photometric measurement.

14 Claims, No Drawings

METHOD FOR DETERMINING PHOSPHATE

CROSS REFERENCE TO PRIOR APPLICATIONS

This application is a U.S. National Phase application under 35 U.S.C. § 371 of International Application No. PCT/EP2018/071663, filed on Aug. 9, 2018 and which claims benefit to German Patent Application No. 10 2017 121 797.5, filed on Sep. 20, 2017. The International Application was published in German on Mar. 28, 2019 as WO 2019/057389 A1 under PCT Article 21(2).

FIELD

The present invention relates to a method for determining phosphate in a water sample and also to a kit therefor.

BACKGROUND

Attempts have been made for many years to reduce phosphate pollution in the environment, in particular from wastewaters.

According to the German Waste Water Ordinance, water treatment plants having a designed capacity for servicing more than 10,000 inhabitants must adhere to a discharge concentration of phosphate of not more than 2 mg/l. This value is 1 mg/l for a designed capacity for more than 100,000 inhabitants.

An exact determination of phosphate content is therefore necessary.

A customary method for determining phosphate in wastewaters is photometric determination using a molybdate-vanadate reagent.

DE 27 28 706 describes a method for automatic phosphate determination which uses as a reagent a solution which contains 25 g of ammonium heptamolybdate, 1 g of ammonium monovanadate, 56 ml of concentrated sulfuric acid, and 1 g of sodium chloride per liter.

The molybdate and vanadate components form a yellow-colored complex together with phosphate. It is presumed that the following reaction takes place:

$(NH_4)_6Mo_7O_{24}+NH_4VO_3+PO_4^{3-}$ 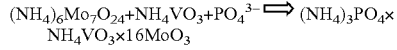 $(NH_4)_3PO_4 \times NH_4VO_3 \times 16MoO_3$ The equilibrium lies on the right-hand side of the equation in an acid medium (pH<2).

In this method, a wastewater sample is measured photometrically, the reagent is added, and after a delay time of from 4 to 5 minutes, a second measurement is carried out.

The phosphate concentration can be determined from the yellow coloration with the aid of a standard solution. The intensity of the yellow color is here proportional to the phosphate concentration when the measurement solution is strongly acidic.

The above measurement method is sometimes also referred to as the molybdenum yellow method. Reference is thereby made, for example, to WO 2016/133882 A1.

Variants of the above method are also known. Reference is thereby made, for example, to U.S. Pat. No. 4,544,639.

Although the above method has in principle been long known, a need remains for an exact phosphate determination which also makes possible the reliable measurement of small phosphate concentrations.

SUMMARY

An aspect of the present invention is to provide a method for determining phosphate which overcomes the disadvantages of the prior art.

In an embodiment, the present invention provides a method for determining a phosphate concentration in a water sample which includes providing the water sample, adding a first acid to the water sample to obtain a second water sample in which a concentration of the first acid is at least 0.5 wt.-%, performing a first photometric measurement of the second water sample, adding a coloring component to the second water sample to obtain a third water sample, performing a second photometric measurement of the third water sample, and calculating the phosphate concentration from a difference between the first photometric measurement and the second photometric measurement.

DETAILED DESCRIPTION

In an embodiment, the present invention provides a method for determining phosphate in a water sample, the method comprising:
a) providing a water sample;
b) adding an acid so that the concentration of the acid in the water sample is at least 0.5 wt.-%;
c) performing a first photometric measurement of the water sample solution;
d) adding a coloring component to the photometric water sample solution;
e) performing a second photometric measurement; and
f) calculating the phosphate concentration from the difference between the first photometric measurement and the second photometric measurement.

According to the present invention, the coloring reagent is thus divided by firstly adding an acid before a first photometric measurement is carried out and then adding the coloring component to the same water sample solution and carrying out the second photometric measurement.

The coloring reagent is a combination of a coloring component and an acid, with the coloring component forming a color when combined with phosphate.

It has surprisingly been found that in the case of water samples, decolorization or a change in the color intensity frequently occurs as a result of the addition of an acid (without addition of a coloring component). This then results in a falsification of the measurement, which in turn results in phosphate concentrations which are too low being found.

While the prior art uses coloring reagent solutions which have an acid concentration in the region of at least 5 wt.-%, and frequently also 10-30 wt.-%, in order to achieve acid concentrations in the region of 0.6 or 0.7% in the water sample, the method of the present invention adds the acid first in order to be able to carry out a first photometric measurement of the acidified solution.

In the first addition of acid, an amount of acid can, for example, be added so that the concentration of the acid in the water sample is at least 0.5 wt.-%, for example, at least 0.7 wt.-%, for example, at least 1 wt.-%, or at least 2 wt.-%, or at least 3 wt.-% of acid. 1 wt.-% means that 99 parts by weight of the water sample have been admixed with 1 part by weight of the concentrated acid. It is of course also possible to use an acid having a lower concentration, which is then used in a larger amount.

The first photometric measurement after the addition of acid can also be considered to be a zero point measurement.

The coloring component typically contains a further acid which can be necessary for the solubility of the reagents, however, the concentration of this further acid in the coloring component is significantly lower than in the prior art, for example, not more than 1 wt.-% or not more than 0.5 wt.-%, for example, about 0.2-0.4 wt.-% of acid in the water sample solution after addition of the coloring component to the water sample solution which has been photometrically measured for the first time.

The acid concentration in the coloring component itself is not more than 8 wt.-%, for example, not more than 6 wt.-%, for example, 3-5 wt.-%. No measurable pH shift in the water sample solution occurs as a result of adding the coloring component. The intrinsic color of the water sample is not influenced by the relatively low proportion of acid in the coloring component.

The method according to the present invention is particularly suitable for process analysis instruments which have a cell installed in a fixed manner in the analysis instrument. Compared to a laboratory method in which, for example, two measurement cells are comparatively measured using two water sample fractions, physical measurement errors are ruled out in a process analysis instrument since the measurement cell is not exchanged in the photometer unit of the analysis instrument. Physical measurement errors arising as a result of different turbidities of the measurement cell itself and/or as a result of optical conditions which are not exactly the same of the two measurement cells cannot occur in the case of a process analysis instrument having a measurement cell installed in a fixed manner.

In an embodiment of the present invention, the proportion of acid in the water sample solution can, for example, be increased to a considerably greater extent by the first addition of acid to the water sample than by the subsequent addition of the coloring component after the first photometric measurement.

The method is particularly suitable for carrying out measurement of wastewater samples, there are, however, additional uses. Phosphate is, for example, sometimes added to industrial water in cooling towers or steam generators in order to act as a corrosion inhibitor. The concentration of these corrosion inhibitors must then be regularly checked.

The following acids are particularly suitable for acidifying the water sample:

Sulfuric acid, nitric acid, hydrochloric acid, substituted benzenesulfonic acid, substituted or unsubstituted acetic acid, or mixtures thereof.

Sulfuric acid can, for example, be used.

In an embodiment of the present invention, the coloring component can, for example, be a reagent based on molybdate and vanadate.

One suitable composition is the composition described in DE-A 27 28 706 in respect of the concentration of molybdate and vanadate, where the acid concentration of the coloring component is lower than in the prior art.

In an embodiment of the present invention, the amount of coloring component can, for example, be matched to the expected amount or concentration of phosphate.

The coloring component based on molybdate-vanadate has an intrinsic yellow color which is increased by the reaction with phosphate.

If very small concentrations of phosphate have been measured, the result is made inaccurate by the intrinsic color of the reagent.

The amount of coloring reagent cannot be varied in the method of the prior art since a strong acidification of the water sample is required in order to avoid the formation of a precipitate resulting from the reaction of the coloring reagent with the phosphate.

A constant amount of acid can be added in the method of the present invention, while the coloring component can be matched to the expected phosphate concentration or to the expected amount of phosphate in the water sample.

This is particularly useful when the measurement of the phosphate concentration is carried out semi-continuously.

Semi-continuously means that the sampling is carried out at fixed time intervals, for example, every 5 minutes, every 7 minutes, every 10 minutes, every 15 minutes, every 30 minutes or every hour, and the sample is then measured.

It is to be expected that the phosphate concentration only changes to a certain extent between two samples. The amount of coloring component used can therefore be adapted manually or automatically therefor.

Corresponding control of the amount of the coloring component can in particular also be carried out in an automated manner.

It is in principle also conceivable to divide an existing water sample into a plurality of parts and carry out measurements with different concentrations of coloring components in order to determine the amount of coloring component best matched to the phosphate concentration.

The coloring reaction between the phosphate and the coloring component added requires a certain reaction time. This depends on the phosphate concentration and is typically in the range from about 1 to 10 minutes.

Wavelengths in the range from 360 to 400 nm are particularly suitable for the photometric measurement. The range from 370 to 380 nm is in particular useful. The two photometric measurements are, in the case of a phosphate determination, normally carried out at the same wavelength in order to be able to obtain reliable information.

The composition of the coloring component can, for example, be as follows:

0.04 mol/l-0.12 mol/l of molybdate ($MoO_4^{2-}$); and
0.001 mol/L-0.01 mol/l of vanadate ($VO^{3-}$).

The coloring component can, for example, be produced from ammonium heptamolybdate and ammonium monovanadate, however, it is in principle also possible to use other salts.

As described in the prior art, the coloring component can contain further constituents (for example, salts, surfactants, etc.).

The present invention also provides a kit containing an acid and a coloring component based on molybdate and vanadate in separate containers.

This makes it possible to supply a corresponding automated apparatus with standardized reagent solutions which can then be used for determining phosphate in an automated apparatus.

The kit can in principle contain further constituents, for example, a calibration solution with standardized phosphate contents, zero standards, and/or purification solutions.

The method of the present invention for determining phosphate is able to determine phosphate in concentration ranges down to less than about 0.02 mg/l.

The method of the present invention will be illustrated in greater detail below via the following examples.

Example 1

A water sample having a volume of 2 ml from the irrigation tank of a municipal sewage treatment plant was filtered and admixed with 0.1 ml of 30% strength sulfuric acid, so that the concentration of the sulfuric acid in the water sample was about 1.4%. The sample was photometrically measured at 370 nm via a photometer and the corresponding value was used as a zero point.

0.1 ml of a coloring component containing 30 g/l of ammonium heptamolybdate, 2 g/l of ammonium monovanadate, and 10 ml/l of 30% strength sulfuric acid was subsequently added so that the resulting increase in the acid concentration in the total water sample solution was thus 0.3%. After a delay time of 4 minutes, a measurement at 370 nm was again carried out. An extinction value of 0.260 was obtained. The phosphate content could be determined from the comparison with a calibrated sample.

Comparative Example

The same water sample was admixed with a coloring reagent containing 30 g/l of ammonium heptamolybdate, 2 g/l of ammonium monovanadate in 30% strength sulfuric acid. The untreated water sample was used as a zero value for the measurement. An extinction of 0.220 was obtained. The value was thus too low. The reason therefor is that the addition of the coloring component alone decreases the extinction by about 0.04.

Example 2

A water sample having a volume of 2 ml from the irrigation tank of a municipal sewage treatment plant was filtered and admixed with 0.1 ml of 30% strength sulfuric acid. The sample was measured at 370 nm using a photometer and the corresponding value was used as a zero point. 0.02 ml of a coloring component containing 30 g/l of ammonium heptamolybdate, 2 g/l of ammonium monovanadate, and 10 ml/1 of sulfuric acid was subsequently added. After a delay time of 4 minutes, a measurement at 370 nm was again carried out. An extinction value of 0.180 was obtained. The phosphate content could be determined from the comparison with a calibrated sample.

Comparative Example 2

The same water sample was admixed with an amount of coloring reagent of 0.1 ml as in Comparative Example 1. Owing to the strong intrinsic color of the coloring reagent, a higher extinction value, here 0.250, resulted. A similar measured value as in the case of the smaller added amount of 0.02 ml was obtained from the comparison with a calibrated sample. Owing to metering fluctuations in the case of a larger added amount of reagent, this measured value is now subject to a greater fluctuation breadth. Very small detection limits (LOD; low detection limit) cannot be achieved at larger added amounts of reagent.

The present invention is not limited to embodiments described herein; reference should be had to the appended claims.

What is claimed is:

1. A method for determining a phosphate concentration in a water sample, the method comprising:
providing the water sample obtained from a sample source, wherein the water sample comprises an expected concentration of phosphate, wherein the expected concentration of phosphate is based upon previous phosphate concentration measurements of water samples from the sample source;
creating an acidified version of the water sample by adding a first acid to the water sample, wherein a concentration of the first acid in the acidified version of the water sample is at least 0.5 wt.-%;
obtaining a zero point measurement for the water sample by performing a first photometric measurement of the acidified version of the water sample;
creating a colored acidified version of the water sample by adding a coloring component, comprising a coloring reagent and a second acid, the second acid being less than 8 wt.-% of the coloring component, in an amount based upon the expected concentration of phosphate, to the acidified version of the water sample, wherein a total acid concentration of the colored acidified version of the water sample is less than 1 wt.-%;
performing a second photometric measurement of the colored acidified version of the water sample; and
calculating the phosphate concentration of the water sample from a difference between the zero point measurement for the water sample and the second photometric measurement of the colored acidified version of the water sample.

2. The method as recited in claim 1, wherein the water sample is a wastewater sample or an industrial water sample.

3. The method as recited in claim 1, wherein the first acid is selected from sulfuric acid, nitric acid, hydrochloric acid, a substituted benzenesulfonic acid, a substituted acetic acid, an unsubstituted acetic acid, and mixtures thereof.

4. The method as recited in claim 1, wherein the coloring component is a reagent based on molybdate and vanadate.

5. The method as claimed in claim 1, wherein each of the first photometric measurement and the second photometric measurement is performed at 360 to 400 nm.

6. The method as recited in claim 1, wherein an amount of the coloring component is matched to the previously known concentration of phosphate of the sample.

7. The method as recited in claim 1, wherein
a plurality of water samples is provided, and
the determining of the phosphate concentration is performed in parallel on the plurality of water samples.

8. The method as recited in claim 1, wherein,
a plurality of water samples is provided, and
the determining of the phosphate concentration is performed on the plurality of water samples semi-continuously.

9. The method as recited in claim 1, wherein 1 to 10 minutes elapses between the adding of the coloring component to the second water sample to obtain the third water sample and the performing of the second photometric measurement of the third water sample.

10. The method as recited in claim 1, wherein the coloring component comprises:
0.04 mol/l to 0.12 mol/l of molybdate ($MoO_4^{2-}$); and
0.001 mol/l to 0.01 mol/l of vanadate ($VO^{3-}$).

11. The method as recited in claim 1, wherein the coloring component comprises from 0.1 to 3 wt.-% of a second acid.

12. The method as recited in claim 11, wherein a first increase in an acid concentration in the water sample by adding the first acid to the water sample to obtain the second water sample is greater than a second increase in the acid concentration in the second water sample via adding the coloring component comprising the second acid to obtain the third water sample.

13. The method as recited in claim 12, wherein the first increase in the acid concentration exceeds the second increase in the acid concentration by a factor of >3.

14. The method as recited in claim 12, wherein the first increase in the acid concentration exceeds the second increase in the acid concentration by a factor of >5.

* * * * *